US007831905B1

(12) United States Patent
Jennings et al.

(10) Patent No.: US 7,831,905 B1
(45) Date of Patent: Nov. 9, 2010

(54) METHOD AND SYSTEM FOR CREATING AND PROVIDING WEB-BASED DOCUMENTS TO INFORMATION DEVICES

(75) Inventors: Grant Jennings, Overland Park, KS (US); Ivan I. Kepych, Overland Park, KS (US); Peter S. Syromiatnikov, Overland Park, KS (US); Robert H. Burcham, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 379 days.

(21) Appl. No.: 10/303,043

(22) Filed: Nov. 22, 2002

(51) Int. Cl.
*G06F 17/00* (2006.01)
*G06F 17/30* (2006.01)

(52) U.S. Cl. ....................... 715/236; 715/234; 715/255; 707/705; 707/803

(58) Field of Classification Search ................. 715/513, 715/530, 501.1, 523, 234–236, 239, 237, 715/238, 243, 246, 255; 709/203; 707/1, 707/100, 705, 802, 803
See application file for complete search history.

(56) References Cited

U.S. PATENT DOCUMENTS 6,327,628 B1 * 12/2001 Anuff et al. ................. 719/311
6,643,658 B1 * 11/2003 Jai et al. ...................... 707/100
6,668,353 B1 * 12/2003 Yurkovic .................... 715/205
6,799,299 B1 * 9/2004 Li et al. ...................... 715/235
6,829,745 B2 * 12/2004 Yassin et al. ................ 715/236
6,857,102 B1 * 2/2005 Bickmore et al. ........... 715/205
6,918,090 B2 * 7/2005 Hesmer et al. .............. 715/760
6,941,511 B1 * 9/2005 Hind et al. .................. 715/235
7,080,067 B2 * 7/2006 Nonomura et al. ................. 1/1
7,134,073 B1 * 11/2006 Fiedorowicz et al. ....... 715/235
7,139,975 B2 * 11/2006 Suzuki et al. ............... 715/236
7,191,163 B2 * 3/2007 Herrera et al. ................ 706/47
7,269,788 B2 * 9/2007 Gharavy ..................... 715/234
7,356,606 B2 * 4/2008 Choate ....................... 709/232
7,376,739 B2 * 5/2008 Ramaswamy et al. ....... 709/226
2002/0052895 A1 * 5/2002 Keating ...................... 707/514
2002/0065852 A1 * 5/2002 Hendrickson et al. ....... 707/517
2002/0073236 A1 * 6/2002 Helgeson et al. ............ 709/246
2003/0078960 A1 * 4/2003 Murren et al. .............. 709/203
2003/0101416 A1 * 5/2003 McInnes et al. ............. 715/513
2003/0126558 A1 * 7/2003 Griffin ........................ 715/513
2003/0135825 A1 * 7/2003 Gertner et al. .............. 715/513
2003/0137537 A1 * 7/2003 Guo et al. ................... 345/751
2003/0151633 A1 * 8/2003 George et al. ............... 345/864
2003/0154071 A1 * 8/2003 Shreve .......................... 704/9
2003/0159111 A1 * 8/2003 Fry ............................ 715/513
2003/0177449 A1 * 9/2003 Rose .......................... 715/530
2003/0225866 A1 * 12/2003 Hudson ...................... 709/221

(Continued)

OTHER PUBLICATIONS

"Extensible Stylesheet Language (XSL)," Version 1.0, W3C Recommendation, Oct. 15, 2001.

(Continued)

*Primary Examiner*—Adam L Basehoar

(57) ABSTRACT

A portal can create and send one or more pages, such as markup language documents, to an information device. The portal can create the page using one or more stylesheets. The stylesheets may include one or more pre-conditions, such as data requirements, in order to use the stylesheet. The portal may use the pre-conditions in obtaining data used to construct the page.

22 Claims, 11 Drawing Sheets

U.S. PATENT DOCUMENTS

| | | | | |
|---|---|---|---|---|
| 2003/0237046 | A1* | 12/2003 | Parker et al. | 715/513 |
| 2004/0205571 | A1* | 10/2004 | Adler et al. | 715/513 |
| 2004/0205605 | A1* | 10/2004 | Adler et al. | 715/517 |
| 2004/0230901 | A1* | 11/2004 | Godwin et al. | 715/513 |
| 2007/0240041 | A1* | 10/2007 | Pearson | 715/522 |

OTHER PUBLICATIONS

"XSL Transformations (XSLT)," Version 1.0, W3C Recommendation, Nov. 16, 1999.
"XML Path Language (XPath)," Version 1.0, W3C Recommendation, Nov. 16, 1999.

* cited by examiner

```
<?xml version="1.0"?>
<xsl:stylesheet xmlns:xsl="http://www.w3.org/1999/XSL/Transform" version="1.0" >
  <xsl:template name="templateName1"> . . . </xsl:template>
  . . .
  <xsl:template name="templateNameN"> . . . </xsl:template>
</xsl:stylesheet>
```

```
<?xml version="1.0"?>
<xsl:stylesheet xmlns:xsl="http://www.w3.org/1999/XSL/Transform" version="1.0" >
        <xsl:template name="My Collection">
    <table width="100%" cellspacing="0" cellpadding="3" border="0">
      <tr>
(1)     <td><a href="{$servlet}?target={$portlet}&action=Mine">My Collection</a></td>
(2)     <td><a href="{$servlet}?target={$portlet}&action=Ours">Shared Collection</a></td>
(3)     <td><a href="{$servlet}?target={$portlet}&action=Download">Download to Phone</a></td>
      </tr>
    </table>
        <table width="100%" cellspacing="0" cellpadding="3" border="0">
          <tr><td id="b">Name</td><td id="b">Description</td></tr>
(4)             <xsl:for-each select="/context/modelData/musicInfo/privatePlayList/item">
          <tr>
            <td>
(5)             <a href="{/context/modelData/musicInfo/vendorURL}?id={@id}">
                  <xsl:value-of select="@name"/>
                </a>
            </td>
            <td>
                <xsl:value-of select="@description"/>
            </td>
          </tr>
          </xsl:for-each>
      </table>
  </xsl:template>

  <xsl:template name="Shared Collection">
        . . .
  </xsl:template>

  <xsl:template name="Download to Phone">
        . . .
  </xsl:template>
</xsl:stylesheet>
```

FIG. 8

```
<?xml version="1.0"?>
<xsl:stylesheet xmlns:xsl="http://www.w3.org/1999/XSL/Transform" version="1.0" >
          <xsl:template name="Personal Music Collection">
          <xsl:param name="servlet">
          <xsl:param name="portlet">
    <table width="100%" cellspacing="0" cellpadding="3" border="0">
      <tr>
                    <td><a href="{$servlet}?target={$portlet}&action=Mine">My Collection</a></td>
                    <td><a href="{$servlet}?target={$portlet}&action=Ours">Shared Collection</a></td>
                    <td><a href="{$servlet}?target={$portlet}&action=Download">Download to Phone</a></td>
      </tr>
    </table>
                    <table width="100%" cellspacing="0" cellpadding="3" border="0">
                              <tr><td id="b">Name</td><td id="b">Description</td></tr>
          <xsl:for-each select="/context/modelData/musicInfo/privatePlayList/item">
                              <tr>
        <td>
                              <a href="{/context/modelData/musicInfo/vendorURL}?id={@id}">
                                                  <xsl:value-of select="@name"/>
                                          </a>
                                  </td>
                                  <td>
          <xsl:value-of select="@description"/>
        </td>
                              </tr>
                              </xsl:for-each>
                    </table>
          </xsl:template>

          <xsl:template name="Another Shared Template">
          . . .
          </xsl:template>
</xsl:stylesheet>
```

FIG. 9

```
<?xml version="1.0"?>
<xsl:stylesheet xmlns:xsl="http://www.w3.org/1999/XSL/Transform" version="1.0" >
        <xsl:include href="Library.xsl" />

        <xsl:template name="My Collection">
                <xsl:call-template name="Personal Music Collection">
                        <xsl:with-param name="servlet" select="$servlet"/>
                        <xsl:with-param name="portlet" select="$portlet"/>
                </xsl:call-template>
        </xsl:template>

        <xsl:template name="Shared Collection">
        . . .
        </xsl:template>

        <xsl:template name="Download to Phone">
        . . .
        </xsl:template>
</xsl:stylesheet>
```

FIG. 10

```
<pcs:requirements>
   <pcs:requirement name="modelSpecName1"> . . . </pcs:requirement>
   . . .
   <pcs:requirement name="modelSpecNameN"> . . . </pcs:requirement>
</pcs:requirements>
```

FIG. 11

```
<pcs:requirements>
  <pcs:requirement name="Music Collections">
    <context>
      <modelData>
        <musicInfo>
          <privatePlayList>
            <item/>
          </privatePlayList>
          <sharedPlayList>
            <item/>
          </sharedPlayList>
          <vendorURL/>
        </musicInfo>
      </modelData>
    </context>
  </pcs:requirement>

  <pcs:requirement name="Download to Phone">
    . . .
  </pcs:requirement>
</pcs:requirements>
```

FIG. 12

```
import com.sprintpcs.portlet.*;

public class MusicPortlet implements Portlet {

        public void handleEvent(PortletEvent event, Context context) {
                String action = (String) event.getParameters().get("action");

                if(action.equals("Mine")) {
                        this.templateName = MY_COLLECTION_TEMPLATE_NAME;
                        this.specName = MUSIC_COLLECTION_SPEC_NAME;
                }
                else if(action.equals("Ours")) {
                        this.templateName = SHARED_COLLECTION_TEMPLATE_NAME;
                        this.specName = MUSIC_COLLECTION_SPEC_NAME;
                }
                else if(action.equals("Download")) {
                        this.templateName = DOWNLOAD_TEMPLATE_NAME;
                        this.specName = DOWNLOAD_SPEC_NAME;
                }
        }

        public String getTemplateName() { return this.templateName; }

        public String getModelSpecName() { return this.specName; }

        public String getTitle() { return "My Music"; }

        public void setDetailLevel(DetailLevel detailLevel, Context context) {
                // this portlet supports only one detail level so do nothing
        }

        public void startup(Context context) {
                // choose an initial state
                this.templateName = MY_COLLECTION_TEMPLATE_NAME;
                this.specName = MUSIC_COLLECTION_SPEC_NAME;
        }

        public void shutdown(Context context) {
                // nothing to do
        }

        private String templateName;
        private String specName;

        private static final String MY_COLLECTION_TEMPLATE_NAME = "My Collection";
        private static final String SHARED_COLLECTION_TEMPLATE_NAME = "Shared Collection";
        private static final String DOWNLOAD_TEMPLATE_NAME = "Download to Phone";

        private static final String MUSIC_COLLECTION_SPEC_NAME = "Music Collections";
        private static final String DOWNLOAD_SPEC_NAME = "Download to Phone";
}
```

FIG. 13

METHOD AND SYSTEM FOR CREATING AND PROVIDING WEB-BASED DOCUMENTS TO INFORMATION DEVICES

FIELD OF THE INVENTION

This invention relates to obtaining content for an information device. More specifically, it relates to a method for obtaining content from a portal.

BACKGROUND OF THE INVENTION

Mobile devices such as mobile phones, personal digital/data assistants ("PDAs"), two-way pagers, etc. are relatively inexpensive, have become commonplace, and are available to most consumers. These mobile network devices can be wireless or wired mobile devices.

Such mobile devices are typically limited to small physical size, light weights and corresponding small display screen sizes. These mobile devices have a number of constraints including limited processing power, limited memory, limited battery life, a limited number of buttons on a user interface, etc.

The larger a processor in a mobile device, the larger the size and weight the device will be. The more memory in a device the more expensive it will be. Faster processors, more memory and color displays consume more battery power.

Content and service providers who provide content and services via mobile devices have to balance the physical constraints of such mobile devices along with the ability to provide applications and content that consumers actually want, and are willing to pay for. The content and services has to be provided to mobile devices in a format that is usable on the mobile device and has to be provided quickly since most users of mobile devices pay for content and services by the minute.

Electronic content such as text, hypertext, graphical data, applications, graphical data images, audio, video, other content or references to such electronic content can be stored by a content provider. For example, the electronic content can be stored in a database server. The database server may reside on a network or other location accessible by the mobile device. The database server downloads or "serves" electronic content from the database to the mobile device.

One way to format and send content to a mobile device is by using a markup language. Markup languages provide control over formatting and layout of electronic content. For example, the electronic content can be embedded into a markup language document. In addition to supporting embedded content, markup language documents also allow references to electronic content. The markup language document can be displayed on the mobile device, for example, using a browser.

One such markup language document is a hypertext document, which can include markup codes called "tags." The structure of hypertext documents is defined by document markup languages such as Hand Held Device Markup Language ("HDML"), Wireless Markup Language ("WML"), Hypertext Markup Language ("HTML"), compact HTML ("cHTML"), eXtensible Markup Language ("XML"), WML and voice extensible Markup Language ("VoxML"), and others.

To create the markup language document, an application generally obtains one or more templates. The templates define the layout and other properties of the markup language document, but they do not define the data needed by the markup language document. In order to determine what data the template uses, the application accesses a class, or other similar object, for the template.

The class can be preprogrammed by a developer, and it can include a definition of the data need by the particular template. For each available template, the application stores a corresponding class that defines the data needed for that template. When the template is called, the application accesses the corresponding class and determines the data needed by the template. The application then obtains the data and uses it in conjunction with the template to create the markup language document.

Obtaining the data in this manner, however, can have several disadvantages. In one disadvantage, each template must have a corresponding class that defines that data it needs. This reduces the flexibility in making changes to a template. For example, a change in the template that eliminates the need for certain data or adds a need for additional data must be accompanied by a corresponding change in the class that defines the data for the template. Changing the corresponding class can be a complicated and time-consuming process, thereby decreasing the ease with which changes can be made to the template.

In another disadvantage, a particular markup language document may be created using multiple templates. In order to determine the necessary data for the all templates, the application processes each template in turn. For example, the application accesses a class for the first template in order to determine the data it needs, and then it retrieves that data for that template. The application then determines and retrieves the data needed for a second template. This process continues for all the remaining templates. Thus, when multiple templates are used, the application performs a series of sequential data accesses in order to obtain the data needed by all the templates. Multiple sequential data accesses take time and consume processing power, and are therefore an inefficient way to access data.

Therefore, there exists a need for a better way to create and format markup language documents for a mobile device.

SUMMARY OF THE INVENTION

In accordance with preferred embodiments of the present invention, some of the problems associated with creating and sending markup language documents to an information device are overcome. A method and system for creating and providing markup language documents to an information device is presented.

In one aspect of the invention, a portal can create markup language documents to be sent to an information device using templates. The portal can retrieve one or more templates used in creating the markup language documents. A template may include a definition of the data needed by that particular template, and the portal may use that definition in order to more efficiently retrieve the data for that template.

These as well as other aspects and advantages of the present invention will become apparent from the following detailed description, with appropriate reference to the accompanying drawings.

BRIEF DESCRIPTION OF THE DRAWINGS

Exemplary embodiments of the present invention are described herein with reference to the drawings, in which:

FIG. 8 illustrates three views, illustrated in FIG. 7, as separate XSLT templates;

FIG. 9 illustrates an XSL file under the name Personal Music Collection;

FIG. 10 illustrates an XSL file that references a template and that includes an xsl:with-param feature;

FIG. 11 illustrates an example requirements section of a stylesheet that can be used to define model data needed by the styleshhet;

FIG. 12 illustrates an example implementation of a music portlet that includes two requirements section, one for a collection view and one for a download view; and FIG. 13 illustrates code of an example MusicPortlet.java implementation written using only the Portlet Interface class.

DETAILED DESCRIPTION OF EXEMPLARY EMBODIMENTS

Exemplary Wireless Network System

Figure 1:
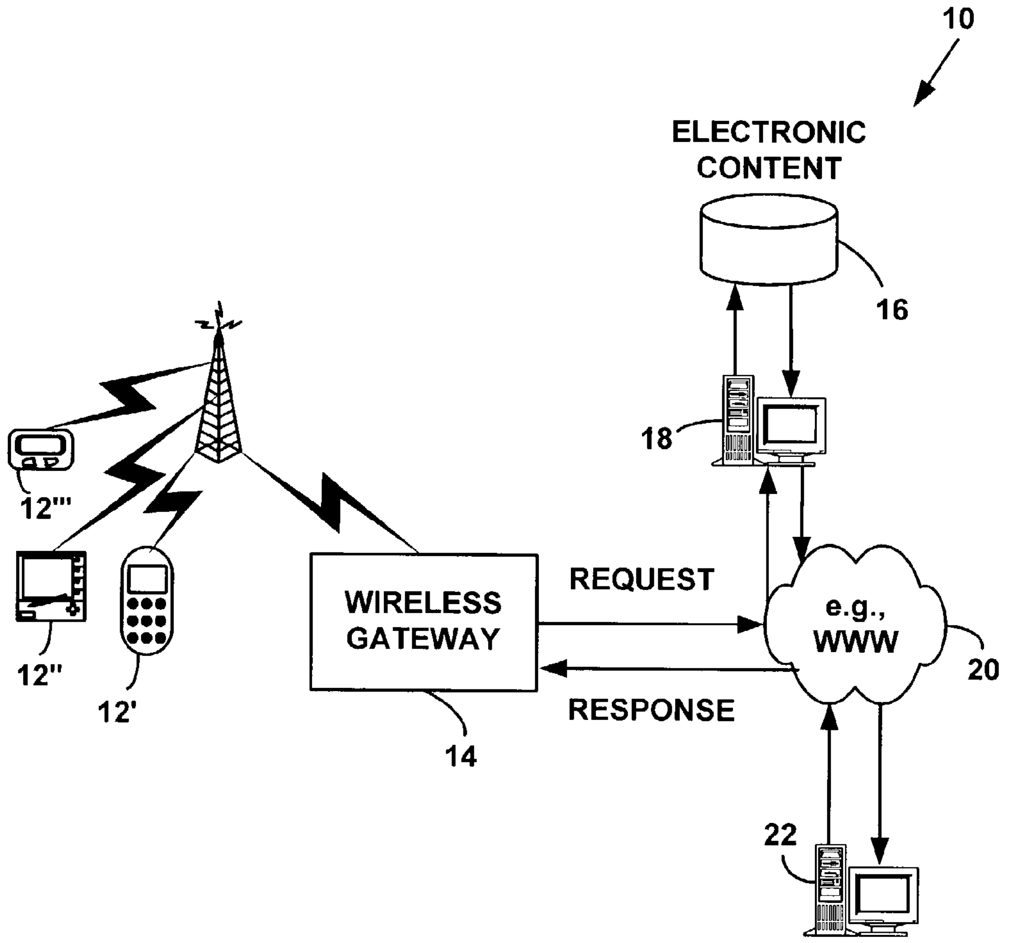
FIG. 1 is a block diagram illustrating an exemplary network system for interfacing mobile and non-mobile devices with a content server.

FIG. 1 is a block diagram illustrating an exemplary network system for interfacing mobile and non-mobile information devices with a content server. Wireless network system 10 includes plural mobile information devices 12, plural wireless gateways 14, plural databases 16 including electronic content, plural database servers 18, an information network 20 and plural non-mobile information devices 22. However, the present invention is not limited to these components and more, fewer or other components can also be used in wireless network system 10. For simplicity, only one wireless gateway 14, database 16 and database server 18 are illustrated in FIG. 1.

The non-mobile information devices 22 include computers, telephones, fax machines, printers, Internet appliances and other data devices. The mobile information devices 12 include mobile phones 12', personal digital/data assistants ("PDA") 12", one and two-way pagers 12'". Other types of wireless mobile information devices may also be used. The wireless gateways 14 provide a wireless interface for the mobile information devices 12. The mobile information devices 12 can communicate with the wireless gateway 14 using a variety of different wireless protocols.

For example, the mobile information devices 12 and the wireless gateways 14 may communicate using code division multiple access ("CDMA"), Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Radio Frequency ("RF"), paging and wireless messaging, Packet Cellular Network ("PCN"), Global System for Mobile Communications, ("GSM"), Generic Packet Radio Services ("GPRS"), Personal Communications Services ("PCS"), Cellular Digital Packet Data ("CDPD"), Wireless Application Protocol ("WAP"), Digital Audio Broadcasting ("DAB"), Bluetooth, 802.11a, 802.11b, or other wireless protocols.

Further information on these wireless interfaces may be found in their respective standards documents. CDMA, for example, is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

The information network 20 includes the Internet, the World-Wide-Web, an intranet, or other information network. As is known in the art, the Internet is a world-wide network of interconnected computers. The World-Wide-Web is an information system on the Internet designed for electronic content interchange. As shown in FIG. 1, the wireless gateway 14 connects to the database server 18 via the WWW 20. Similarly, the non-mobile information devices 22 connect to the database server 18 via the WWW 20.

It should be understood that, however, that the WWW 20 is merely exemplary in nature, and mobile and non-mobile information devices 12, 22 may connect to the database server 18 via a variety of different ways. For example, the non-mobile information devices 22 may be located on a local area network ("LAN"), such as an Ethernet or other type of network. The LAN may in turn interface with the Internet, WWW or other type of network that provides access to the database server 18. Similarly, the wireless gateway 14 may connect to the database server 18 via one or more different networks that in turn provide access to the database server 18.

Once connected to the database server 18, the mobile and non-mobile information devices 12, 22 can receive electronic content from the database server 18, and the electronic content can be stored on one or more databases 16. The databases 16 include electronic content such as text, hypertext, graphical data or references to graphical data images, audio, video and other content. The electronic content may be stored as a Web page or WAP page on a database server 18. Of course, it may also be stored using a variety of other different formats. The database server 18 downloads or "serves" electronic content from the database 16 to the information devices 12, 22.

It should be understood that the database server 18 and the databases 16 are merely one example of methods for storing and serving electronic content to an information device 12, 22. Thus, it is not necessary that the available electronic content be stored in database. Rather the electronic content may be stored using a variety of different storage mechanisms, and it may be provided to the information devices 12, 22 via other types of servers.

There are many different methods for sending static (e.g., markup language) content to an information device 12, 22. Most electronic content on the Internet comes out of simple, static files. Dynamic content is also generated in application servers and Web servers, largely based upon information extracted from a database and capable of being modified dynamically (e.g., using XML, Java applets, Java Servlets, Enterprise JavaBeans ("EJBs"), MIDlets, or other server-side technologies). The electronic content can be formatted and sent to the information devices 12, 22 using a variety of different formats. For example, the electronic content may be sent to an information device 12, 22 as part of a hypertext document, which can be created using a markup language.

A hypertext document includes markup codes called "tags." The structure of hypertext documents is defined by document markup languages such as Hand Held Device Markup Language ("HDML"), HTML, XHTML, compact HTML ("cHTML"), eXtensible Markup Language ("XML"), WML and voice extensible Markup Language ("VoxML"), and others. Markup languages also allow references to additional electronic content besides text including graphics, animation, audio, video, applets and other electronic data.

The WAP includes several protocols and standards designed to provide wireless devices with access to electronic content, and it was developed as an alternative to other markup languages and protocols developed for the World-Wide-Web. One component of the WAP is a Wireless Markup Language ("WML"), which includes markup tags, and provides control over formatting and layout of electronic content. The WML is often more appropriate to use for wireless devices such as wireless phones than other markup languages such as Hypertext Markup Language ("HTML"), etc.

Electronic content is typically displayed on an information device 12, 22 with a software application called a "browser." A browser on an information device 12, 22 may be a sub-set of a larger browser, or a micro-browser. A micro-browser may not be capable of displaying complete content of a requested electronic content as stored on database server 18. A micro-browser typically reads electronic content and renders the electronic content into a presentation of text, graphics, animation, audio, video, etc., for display on the information devices 12, 22.

The devices illustrated in FIG. 1 interact with wireless network system 10 based on standards proposed by the Institute of Electrical and Electronic Engineers ("IEEE"), International Telecommunications Union-Telecommunication Standardization Sector ("ITU"), Internet Engineering Task Force ("IETF"), Wireless Application Protocol Forum ("WAP") Forum, Java Community, the American National Standard Institute ("ANSI"), or other standards.

IEEE standards can be found on the World Wide Web at the IEEE organization website. The ITU, (formerly known as the CCITT) standards can be found at the ITU international website. IETF standards can be found at the IETF organization website. The WAP Forum standards can be found at the WAP Forum organization website. The Java Community standards can be found at the Java sub-domain of the Sun Microsystems commercial website. ANSI standards can be found at the ANSI organization website.

An operating environment for devices and interfaces used for the present invention includes a processing system with one or more high speed Central Processing Unit(s) ("CPU"), or other types of processors, and a memory system. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU or processor. The computer readable medium includes cooperating or interconnected computer readable medium, which exist exclusively on the processing system or be distributed among multiple interconnected processing systems that may be local or remote to the processing system.

Exemplary Portal Framework

Figure 2:
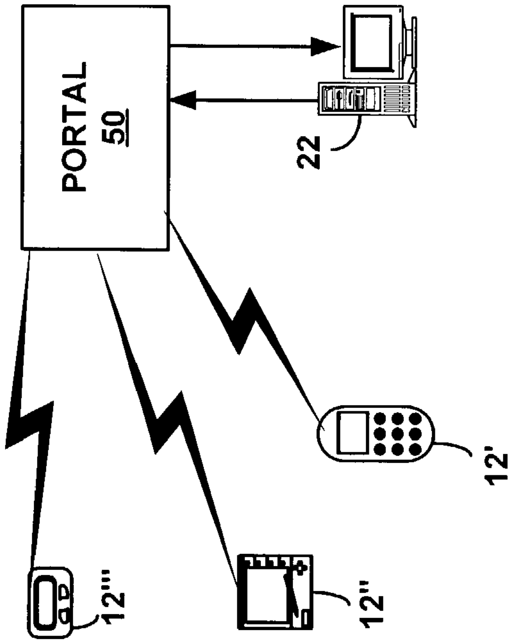
FIG. 2 is a block diagram illustrating an exemplary system for interfacing the mobile and non-mobile devices of FIG. 1 with a portal for serving content to the devices.

FIG. 2 is a block diagram illustrating an exemplary system for interfacing the mobile and non-mobile devices of FIG. 1 with a portal for serving content to the devices. The portal 50 can serve as an interface for the information devices 12, 22. For example, the portal 50 may be an application running on the database server 18. A client application (e.g., a browser) running on an information device 12, 22 can access the portal 50. The portal 50 can receive requests from the client application, retrieve content from the databases 16, format the content into a format usable by the client application, and send the content to the client application.

The portal 50 can receive requests for information from the information device 12, 22. In response to the requests, the portal 50 can obtain content, format the content in a format usable by the information device 12, 22, and send the content to the information device 12, 22. For example, the portal 50 may send the information device 12, 22 using one or more markup language documents. As previously described, markup language documents may include various types of embedded content, and they may also include references to various types of content. The markup language documents may be displayed to a user via a browser. The user of the information device 12, 22 can use the markup language documents to further interact with the portal 50, such as to receive other content.

One language for expressing templates is XSL; however, it should be understood that XSL is merely exemplary in nature, and the portal 50 may use other stylesheet languages. XSL includes an XSL Transformations ("XSLT") language, which can be used to transform XML documents into an HTML or other text-based document. It also includes an XML Path ("XPath") language, which is an expression language used by XSLT to access or refer to parts of an XML document. Finally, it includes an XML vocabulary for specifying formatting semantics. An XSL stylesheet can contain multiple templates that specify the presentation of a class of XML documents by describing how an instance of the class is transformed into an XML document that uses the formatting vocabulary.

XSL is described in more detail in "Extensible Stylesheet Language (XSL)," Version 1.0, W3C Recommendation, 15 Oct. 2001, which is incorporated herein by reference. XSLT is described in more detail in "XSL Transformations (XSLT)," Version 1.0, W3C Recommendation, 16 Nov. 1999, which is incorporated herein by reference. XPath is described in more detail in "XML Path Language (XPath)," Version 1.0, W3C Recommendation, 16 Nov. 1999, which is incorporated herein by reference.

Figure 3:
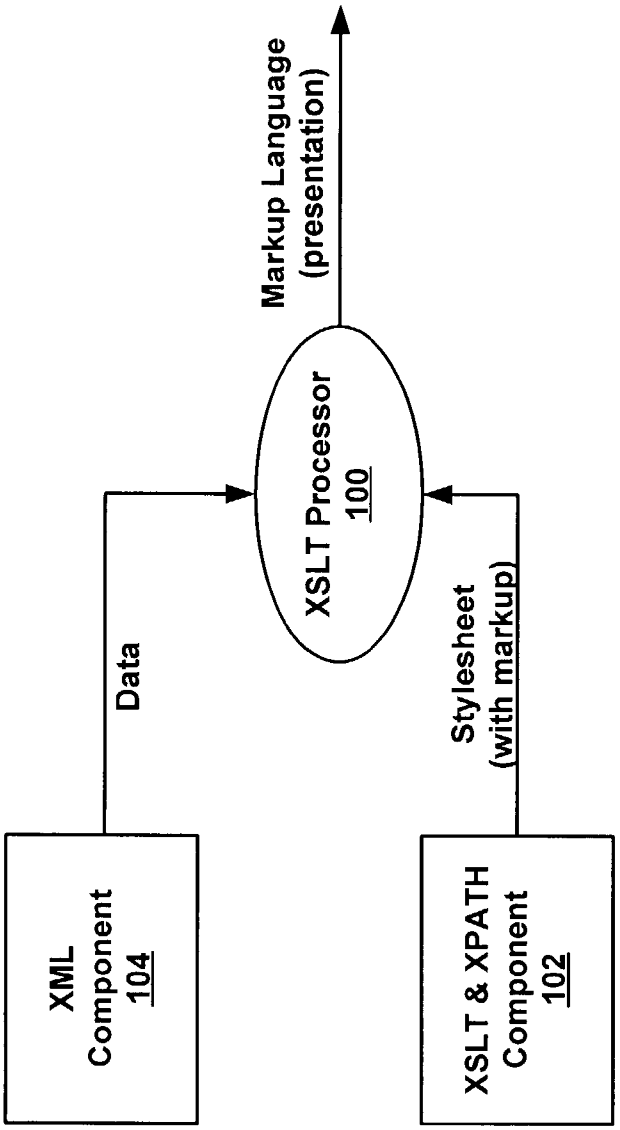
FIG. 3 is a block diagram of an exemplary portal framework implementation.

FIG. 3 is a block diagram of an exemplary portal framework implementation. As shown in FIG. 3, the portal framework includes an XSLT Processor 100, an XSLT & XPATH Component 102 and an XML Component 104. The XSLT Processor 100 can receive stylesheets and data as inputs. It can then use the stylesheets and data to create and format a page, such as a markup language page, to be sent to the information device 12, 22. The information device 12, 22 can in turn display the page, for example using a browser or other application.

An XSLT & XPATH Component 102 stores stylesheets that can be used by the XSLT Processor 100. The XSLT Processor 100 can retrieve one or more stylesheets from the XSLT & XPATH Component 102, which can then be used to create a page for an information device. The stylesheets may themselves specify the data that is needed to create the page, such as by specifying one or more pre-conditions for using the stylesheet.

The XSLT Processor 100 can obtain data from an XML Component 104. In an exemplary embodiment, the XML Component 104 includes a domain model of data that can be used by a variety of different stylesheets. The data represented in the domain model can be stored in a variety of different locations. For example, the data may be distributed across one or more different networks. In another example, it may be stored in multiple different locations on the same network.

The domain model can represent the available data in a variety of different ways, such as a collection of data objects. The XSLT Component 104 can traverse the domain model in order to find and obtain the data needed by the stylesheet, and it can create an XML file that includes that data. For example, the data objects in the domain model needed by a stylesheet can be retrieved and mapped to an XML tree in an XML file, which can then be used by the XML Processor 100.

Figure 4:
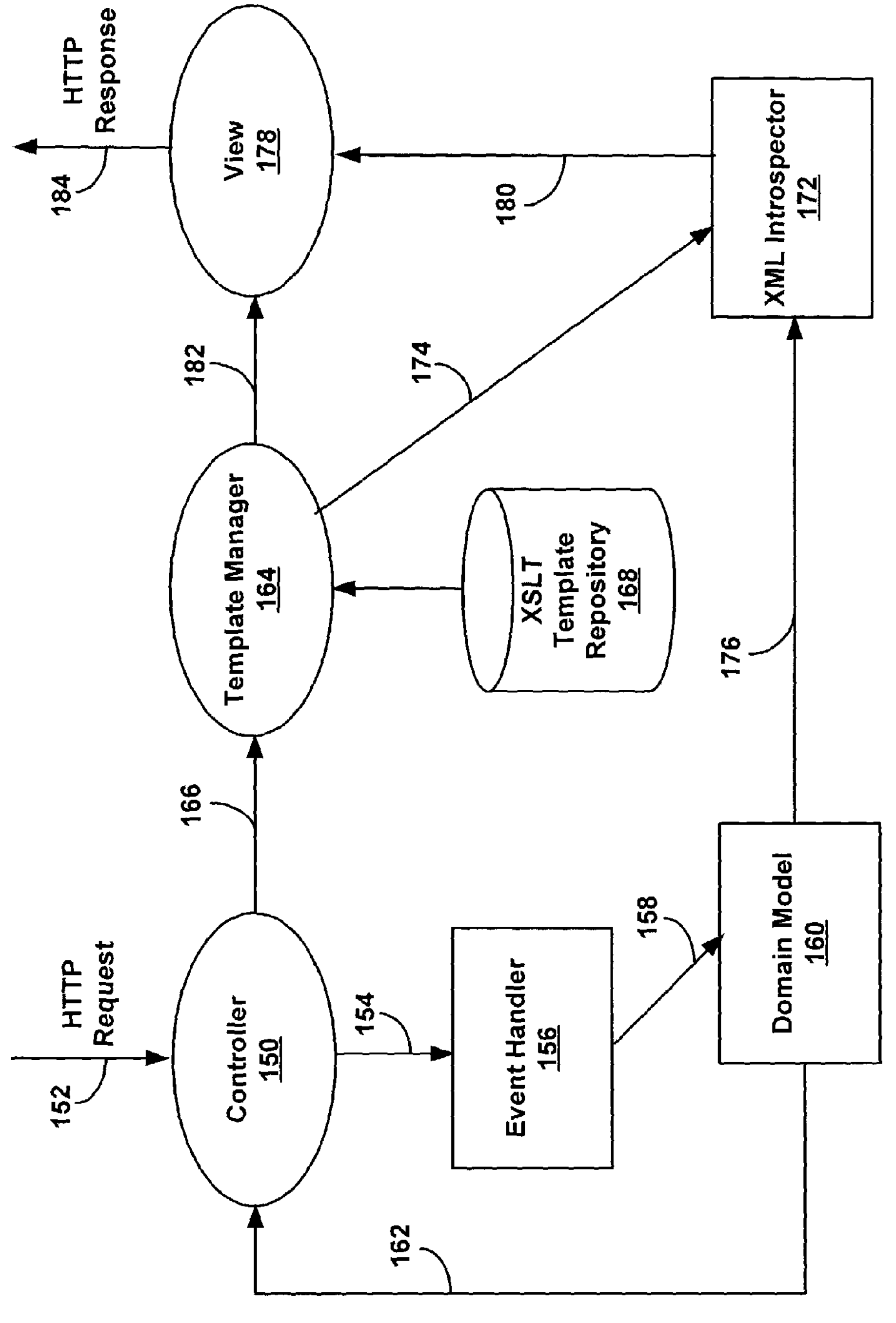
FIG. 4 is a flow diagram illustrating an exemplary operation of the portal framework implementation of FIG. 3.

FIG. 4 is a flow diagram illustrating an exemplary operation of the portal framework implementation of FIG. 3. FIG. 4 depicts additional components, which may together comprise the portal framework implementation of FIG. 3. For example, FIG. 4 depicts various software modules that can function together as the XSLT Processor 100 of FIG. 3.

As shown in FIG. 4, a Controller 150 receives dataflow 152 as an input. The Controller 150 can be, for example, an application running on a computer or other device. In an exemplary embodiment, the Controller 150 is implemented by a Java servlet. However, the Controller 150 may be implemented using a different type of Java application, or it may be implemented using a non-Java language.

Dataflow 152 may be any type of request from the information device 12, 22. For example, dataflow 152 may be an HTTP request. The request may be a request for data, a request to perform a specified action or some other type of request. By way of example, the flow diagram of FIG. 4 will be described with respect to a request from an information device 12, 22 to update an address for a user of the information device 12, 22. Thus, the request received by the controller 150 can be a request from the information device 12, 22 to initiate the address change.

In response to the request, the Controller 150 sends dataflow 154 to an Event Handler 156. The dataflow 154 notifies the Event Handler 154 to perform a specific action. In this example, the Event Handler 154 responds by sending dataflow 158 to a Domain Model 160 in order to retrieve the user's current address. The Domain Model 160 stores a model of data available to a variety of different stylesheet. The Domain Model 160 can model the available data in a variety of different ways, such as a collection of objects or instances of the available data.

Returning to the address change example, the user's current address can be retrieved using the Domain Model 160 and returned to the Controller 150. The Controller 150 next passes the current state, which includes the user's current address retrieved using the Domain Model 160, to a Template Manager 164. The current state is passed to the Template Manager 164 as dataflow 166. The Template Manager 164 receives the dataflow 166, and it retrieves the necessary stylesheets to perform the requested operation of changing the user's address. The stylesheets are retrieved from an XSLT Template Repository 168, which stores a variety of different XSLT stylesheet templates. In this case, the XSLT Template Repository 168 returns the stylesheets needed to update the user's address to the Template Manager 164 via dataflow 170.

Depending on the requested operation, the Template Manager 164 may obtain one or more templates from the XSLT Template Repository 168. For example, some operations may use only one template, while other operations may use two or more templates. Each template used by the Template Manager 164 can specify certain data it needs from the Domain Model 160, such as by defining one or more pre-conditions for using the template. The pre-conditions can be described in the template. The pre-conditions may be, for example, specified using XML; however, they may be defined using other languages as well.

The Template Manager 164 then passes to an XML Introspector 172 via dataflow 174 the pre-conditions for the stylesheets sent to the Template Manager 164. The XML Introspector 172 handles traversing the Domain Model's representation of all the available data object in order to retrieve only the data needed by the stylesheets. The Domain Model 160 may describe the available data, for example, using nested representations, which can in turn be mapped to an XML tree in the XML file. The XML file can then be returned to the XML Introspector 172 via shown at dataflow 176. Alternatively, the Domain Model 160 may return the data via dataflow 176, and the XML Introspector can create the XML file.

As previously described, multiple stylesheets may be used in creating a page for the information device 12, 22. Each stylesheet may in turn include one or more pre-conditions. Thus, in creating one page the XML Introspector 172 may receive multiple pre-conditions corresponding to a variety of different data. In one exemplary embodiment, the XML Introspector 172 can consolidate two or more pre-conditions prior to traversing the Domain Model 160 in order to obtain the data. For example, the XML Introspector 172 may combine multiple XML pre-condition descriptions into a single XML description, thereby reducing the number of accesses of the Domain Model 160. This allows for a more efficient retrieval of the data.

Once the data is retrieved, the XML Introspector 172 passes it to a View 178, shown by dataflow 180. For example the XML Introspector 172 may pass the View 178 and XML file that includes the data. The Template Manager 164 passes the View 178 the stylesheets, shown by dataflow 182. The View 178 then uses the stylesheet and the data to create a page for the information device 12, 22. For example, the View 178 may use the stylesheet and data to create a markup language page, such as an HTML or other markup language page, to send to the information device 12, 22. It is possible, however, that the View 178 formats the data into a page other than a markup language page.

Then, the View 178 sends the page to the information device 12, 22. Thus, the page may be a response to the initial request, shown at dataflow 184. The response may be formatted as an HTTP response, but other formats may also be used. In the address update example, the page may prompt the user for additional information, such as the new address. The page may additionally include mechanisms to return the information to the portal 150 in order to the update the user's address.

Figure 5:
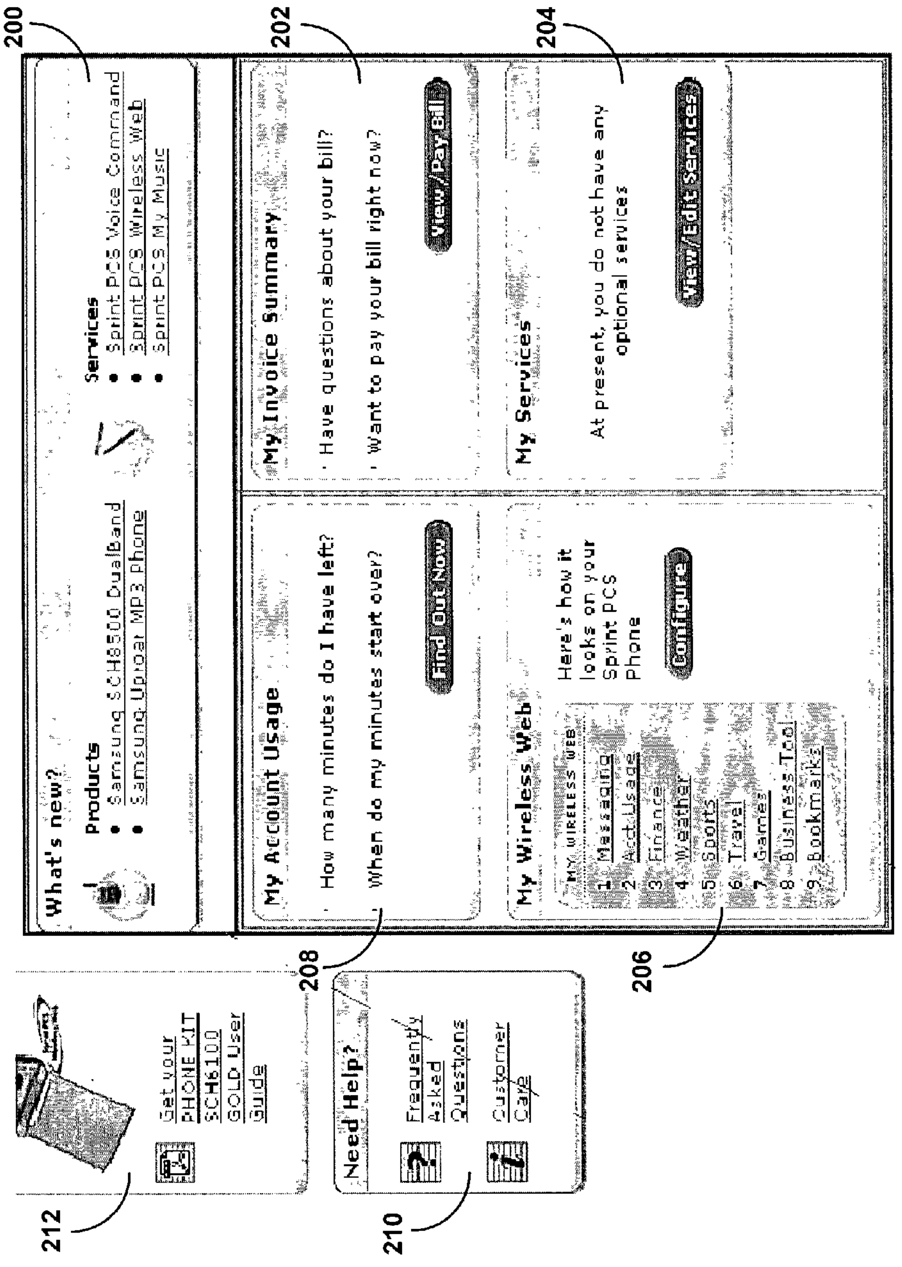
FIG. 5 is a block diagram of an exemplary page that can be created by the portal framework of FIGS. 3 and 4.

FIG. 5 is a block diagram of an exemplary page that can be created by the portal framework of FIGS. 3 and 4. The page may include an arrangement of modules, which may be termed "portlets." The portlets are located in the page according to a predefined set of rules or "layouts." In one embodiment, the layouts are predefined such that they are not alterable by a user. In another embodiment, the layouts may be optionally configured or created by a user, thereby allowing the user to customize the display of pages on the information device 12, 22. It should be understood, however, that the portal 150 can be used to create pages that do not include portlets.

As depicted in FIG. 5, the page includes seven portlets 200, 202, 204, 206, 208, 210, 212. A page, however, may include a greater or fewer number of portlets. The portlets 200-212 are generally distinct display areas on the page. The particular display of a portlet may be defined by an XSLT stylesheet or other such template. Thus, the page can be an aggregation of XSLT templates. For example, a main XSLT template can be used to define the general layout of the page. The main XSLT template may include references to other templates, which can define the display of the portlets.

Once a page is initially created and sent to the information device, the portlets may remain active and continue to perform various actions, for example in response to requests from the information device. In addition to initializing a portlet, the mobile station may make a request to minimize the portlet, close the portlet, maximize the portlet, change the portlet's detail, take an action based on a button click inside the portlet or to otherwise cause the portlet to perform another action. The request may, for example, cause a change in the display of a portlet, may cause the page to remove a portlet or may cause the page to display an additional portlet.

An exemplary embodiment of the invention may be in the form of a method for creating a markup language page for an information device, where the method includes: (i) detecting an event for an information device, (ii) retrieving an XSLT stylesheet for presenting a markup language page for the event, wherein the stylesheet includes an XML description of data needed in order to use the stylesheet, (iii) using the XML description to parse a data model and retrieve data needed by the XSLT stylesheet, wherein the data model stores a representation of data available to a plurality of stylesheets, and (iv) creating an XML document that includes the data needed in order to use the XSLT stylesheet.

Further, retrieving an XSLT stylesheet to handle the event includes obtaining a plurality of XSLT stylesheets, wherein each of the plurality of XSLT stylesheets includes an XML description of data needed in order to use that respective XSLT stylesheet, and wherein using the XML description in order to parse the data model includes: (i) combining the XML descriptions of each of the XSLT stylesheets into a single XML description, and using the single XML description to perform a single traversal of the data model in order to obtain data needed by the plurality of XSLT stylesheets.

Further still, and alternatively, the XSLT stylesheet includes a plurality of XML descriptions of data needed in order to use the XSLT stylesheet, and wherein using the XML description in order to parse the data model includes (i) combining the XML descriptions into a single XML description, and (ii) using the single XML descriptions to perform a single traversal of the data model in order to obtain the data specified by the plurality of XML descriptions.

Exemplary Portlet Code

A portlet can include three different parts: 1) a presentation XSLT, 2) a model specification, and 3) a portlet behavior. The presentation XSLT is generally a set of XSLT template rules that describes the presentation of the portlet in a markup-specific way. The model specification is generally a set of XML entities that specifies data needed to support the presentation. The portlet behavior generally includes all portlet-specific code that uses a Portlet API, such as Java implementation of the Portlet interface.

1.1 A. Presentation XSLT

Figures 6, 7:
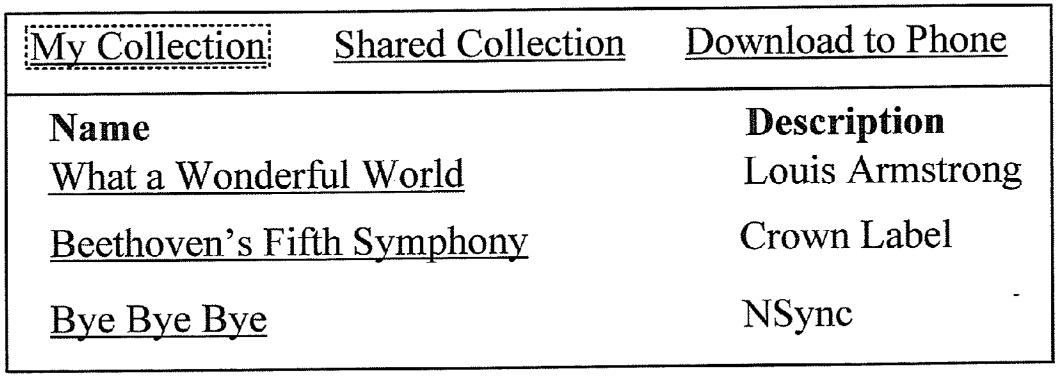
FIG. 6 illustrates an example stylesheet that is a standard XSL file without extensions.
FIG. 7 illustrates an example private music collection view that can be displayed to a user by a browser running on an information device.

The portlet presentation can be defined by a stylesheet in which each view of the portlet is described by a template. The stylesheet can be a standard XSL file (without extensions), such as is shown in FIG. 6.

A portlet may perform various different functions. By way of example, a music portlet is described that can be used to let a user view private and shared music collections and that can let a user download music to an information device 12, 22. FIG. 7 illustrates an exemplary private music collection view, such as can be display to a user by a browser running on an information device 12, 22.

The three views can be expressed as separate XSLT templates, as shown below in FIG. 8.

The first three numbered lines show the use of the xsl:params servlet and portlet to build the URL. These values are provided by the framework at runtime and allow a degree of abstraction from framework-specific information. The servlet parameter designates the framework controller, and the portlet parameter identifies the current portlet. By placing "target={$portlet}" in the URL, the portlet developer indicates that this portlet will handle the event associated with that URL. When the event occurs, the framework will use the information to route the event to the portlet's event handler. Note also the use of action=actionName to designate the type of event; that convention is not mandated by the framework, but it is strongly recommended for readability and because it enables the use of an application-level security manager. Lines (4) and (5) relate to the model specification and are described below.

The stylesheet supports the use of xsl:include and xsl:call-template, so portlet developers can build libraries containing reusable pieces. A library stylesheet looks like a normal portlet stylesheet except that the xsl:params servlet and portlet are explicitly defined. For example, suppose that the "My Collection" template, which was previously described, is common to several portlets. Rather than defining it in the stylesheet for the Music portlet, it could be defined (along with other shared templates) in another file called Library.xsl under the name "Personal Music Collection", which is illustrated in FIG. 9.

The Music portlet's stylesheet would simply reference the template in the library as shown in FIG. 10. The xsl:with-param in FIG. 10 is used to provide the variables needed to build the links.

1.2 B. Model Specification

The model data available to all stylesheets can be specified in an XML file. The model data needed by a particular stylesheet can be defined in the stylesheet. For example, the stylesheet may include one or more "requirements" sections that define pre-conditions for using the stylesheet, such as data needed by that particular stylesheet. It should be understood that the label "requirements" is merely arbitrary, and any other label may be used for this section. FIG. 11 depicts an exemplary requirements section of a stylesheet that can be used to define the model data needed by that stylesheet.

Each entry specifies a subset of the model as a traversal path from some root. The root can be arbitrarily defined. In an exemplary embodiment, the root can be the Context Class for the Portlet API, which will be described later in further detail. FIG. 12 shows an exemplary implementation of the previously described music portlet that includes two requirements sections—one for the collection view and one for the download view.

A portlet developer should preferably ensure that each template's model requirements can be satisfied by a model spec. As previously described, the "My Collection" template references the paths "/context/modelData/musicInfo/privatePlayList/item" and "/context/modelData/musicInfo/vendorURL" in lines (4) and (5). Since the "Music Collections" model spec includes those paths, the template and model spec can be associated to build the view. That association can be performed by an object that implements the Portlet interface in the Portlet API as will be described in further detail in the next section.

1.3 C. Portlet Behavior

A user can interact with a portlet in a variety of different ways. A portlet displayed in a page on a browser may include, for instance, various buttons or other data entry points. A user may select one of the buttons, which in turn causes the portlet to perform a specific action for that selection. For example, the user may select a button that causes the portlet to minimize, maximize or change some other display feature of the portlet. In another example, and returning to the previous music view example, the user may select a button in the portlet that in turn causes the portlet to download a music file to the information device 12, 22. This action may, although not necessarily so, also cause a change in the portlet's display.

Developers can implement the behavior of portlets in Java using the Portlet API. In a minimal portlet implementation, a developer may write only one class that implements a Portlet Interface. A more robust implementation, however, may use one or more of the following classes: Context Interface, DetailLevel Class, Portal Interface, Portlet Interface, PortletConfiguration Interface, PortletEvent Interface, PortletSecurityManager Interface, TransportHandle Interface, and UserDeviceInfo Interface.

An implementation of the Portal Interface allows for a functioning portlet. The Portlet Interface allows the interface allows the portlet to, at any point in time, handle its own events and designate which presentation template and model specification to use for its current state. The portal framework delivers portlet events to the portlet as they occur, inform the portlet of changes in detail level, and gives the portlet the opportunity to perform startup and shutdown activities at the appropriate time.

FIG. 13 is code of an exemplary MusicPortlet.java implementation written using only the Portlet Interface class.

The Context Interface provides access to the context in which the portlet is running. Its scope includes the current request, session, application and portal. An implementation of this interface is passed to the portlet as necessary when the framework invokes the portlet's methods. Portlets can read and write data to the context, and its contents can be references by the portlet's XSL. Table 10 shows exemplary functions that may be implemented in the Context Interface.

TABLE 10

| | |
|---|---|
| Map getAppplicationData( ); | Returns a map containing data that is common to the entire application. It is shared by all portlet instances within all sessions. |

TABLE 10-continued

| | |
|---|---|
| Map getModelData( ); | Returns a map containing data that exists for the life of the session. It may be shared by all portlet instances running in the current session. The BOM resides here, as does various portlet-specific data. |
| Portal getPortal( ); | Returns an object that represents the portal in which the portlet is running so that the portlet can manipulate it. |
| Map getRequestData( ); | Returns a map containing data that exits only for the life of the request. The data will be cleaned out before the next event is processed. Portlets can use this as a scratch area in which temporary data can be placed for use by the stylesheet. |

The DetailLevel Class enumerates the detail levels that portlets may support. An instance representing one of these detail levels is passed as a parameter to the setDetailLevel method in the Portlet interface. In one exemplary embodiment, the following four detail levels can be enumerated: identity, minimum, summary and maximum. The identity detail level shows only the portlet identity, and no portlet content is revealed. The minimum detail level shows a very small amount of portlet content. The summary detail level shows a small but useful amount of portlet content. The maximum detail level shows the full portlet content.

The Portal Interface is the access point through which portlets manipulate the portal. It is intended to provide functionality in a manner that is independent of the portal framework's implementation and visual layout style. Table 11 shows exemplary functions that may be implemented in the Portal Interface.

TABLE 11

| | |
|---|---|
| void displayPortlet(String portletName); | Instructs the portal to add the named portlet to the collection of displayed portlets. The portal will determine the position and size of the portlet. |
| String[ ] getClosedPortlets( ); | Returns a list of names of portlets that may appear on the user's main portal page but are not current visible. |
| UserDeviceInfo getUserDeviceInfo( ); | Returns an object that provides access to information about the user's device. |
| TransportHandle getTransportHandle( ); | Returns an object that provides abstracted access to the transport protocol. |
| void maximizePortlet(String portletName); | Instructs the portal to display the named portlet as large as possible. The portal will determine the position and size of the portlet. |
| void reset( ); | Instructs the portal to return to the main portal page. |

The Portlet Interface allows for a functioning portlet. The portlet framework invokes these methods on a portlet to request display information, inform the portlet of user event and manage the portlet lifecycle. The portlet framework may instantiate a portlet at any time. When the portlet framework determines that a portlet is to be displayed, it will activate the portlet by calling startup( ); and then initialize the portlet's detail level by calling setDetailLevel. At this point, the portlet should have all the information necessary to specify the XML template name and model spec name for its current view. At display time, the portlet framework will ask the portlet for this information by calling getTemplateName, getModelSpecName, and optionally getTitle.

Then, the portlet will remain idle until one of three things happens that may change the portlet's state. First, a portlet event occurs. In response, the portlet framework may call handleEvent. Second, something causes a detail level change. In response, the portlet framework calls setDetailLevel. Third, the portlet is closed. In response, the portlet framework calls shutdown, and the portlet is removed from view. After one of these events happens, and if the portlet is still in view, the portlet framework will again request the view information. This cycle can continue until the portlet framework call shutdown.

Table 12 shows exemplary functions that may be implemented in the Portlet Interface.

TABLE 12

| | |
|---|---|
| String getModelSpecName( ); | The portal framework calls this method when it needs to know the name of the model spec (e.g., pcs:requirement in the previous examples) needed for the current view of the portlet. Optimally, the portal framework only calls this method when the portlet may have changed state; however, the portlet generally should not make this assumption. An exemplary implementation of this method does not do any computation but simply returns the value of an instance variable. |
| String getTemplateName( ); | The portal framework calls this method when it needs to know the name of the template to be used to display the current view of the portlet. Optimally, the framework should call this method only when the portlet make have changed state; however, the portlet generally should not make this assumption. An exemplary implementation of this method does not do any computation but simply returns the value of an instance variable. |
| String getTitle( ); | The portal framework calls this method when it needs to know the title to be associated with the portlet, usually to be displayed in the portlet frame. Optimally, the framework should call this method only when the portlet make have changed state; however, the portlet generally should not make this assumption. An exemplary implementation of this method does not do any computation but simply returns the value of an instance variable. |
| void handleEvent(PortletEvent, Context context); | This method is called when a portlet-specific event occurs. Portlet events occur when a client access a URL that is designated as handled by the portlet. |
| void setDetailLevel(DetailLevel detail, Context context); | The portal framework calls this method when the portlet is closed or the session times out. The portlet can use this opportunity to free resources or perform other finalization activities. |
| void shutdown(Context context); | The portal framework calls this method when the portlet is closed or the session times out. The portlet can use this opportunity to free resources or perform other finalization activities. |
| void startup(PortletConfiguration config, Context context); | The portal framework calls this method once shortly before the portlet is displayed to allow the portlet to perform initialization. It will be followed by an initial call to setDetailLevel so any initialization that depends on detail level can be deferred until then; however, this is the only time a portlet has access to its configuration attributes. Since setDetailLevel may be called many times, developers should be cognizant of repetitive initialization. |

The PortletConfiguration Interface provides access to a portlet's configuration attributes. These attributes are provided to the portal framework as a part of application deployment. Some attributes are required by the portal framework, but others may be specialized for the needs of the portlet. An object of this type is passed to the portlet during startup. Table 13 shows exemplary functions that may be implemented in the PortletConfiguration Interface.

TABLE 13

| | |
|---|---|
| Map getAttributes( ); | Returns a map containing all the configuration attributes provided for this portlet. |

The PortletEvent Interface provides access to the event parameters associated with a user request. An object of this type is created by the portal framework and passed as a parameter to the handleEvent method when a portlet-specific event occurs. Table 14 shows exemplary functions that may be implemented in the PortletEvent Interface.

TABLE 14

| | |
|---|---|
| Map getParameters( ); | Returns a map containing all URL parameters except the required target attribute. For example, if the XSL that generated the link is: "<a><href="{$servlet}?target={$portlet} &action=Mine">My Collection</a>", then the event will contain one parameter whose name is "action" and value is "Mine." |

The PortletSecurityManager Interface may be implemented for portlets whose security is governed by business rules. Generic security management is performed by the portal framework, and the methods in this interface are not called unless those checks are passed first. The class that implements this interface must be registered with the portal framework in a framework-prescribed way.

It should be noted that there is no specification for when and how many instantiations of this class occur. The portal framework may instantiate a single instance to be used for all relevant portlets, so the implementation must be threat safe. For performance reasons, it is preferred that no member variables are used so that no methods need to be synchronized. Table 15 shows exemplary functions that may be implemented in the PortletSecurityManager Interface.

TABLE 15

| | |
|---|---|
| boolean checkEvent(PortletEvent event, Context context); | Returns whether the portlet may receive the specified event that is targeted for it. This method is called after the portal framework performs generic security checks. |
| boolean checkInstantiation(PortletConfiguration config, Context context); | Returns whether the portlet may be instantiated by the portal framework. This method is called after the portal framework performs generic security checks. |

The TransportHandle Interface allows a portlet to access transport functionality. An object of this type is accessible via the getTransportHandle method of Portal. It contains only a minimal subset of functionality common to the transports supported by the portal framework. Table 16 shows exemplary functions that may be implemented in the TransportHandle Interface.

TABLE 16

| | |
|---|---|
| void setRedirectUrl(String url); | Instructs the framework to send a redirect response to the client using the specified redirect location URL. |

The UserDeviceInfo Interface provides access to information about the user device associated with the current session. Portlets can use this information to adapt their appearance to various devices and content types. Table 17 shows exemplary functions that may be implemented in the UserDeviceInfo Interface.

TABLE 17

| | |
|---|---|
| String getContentType( ); | Returns the preferred content type of the device associated with the current session. |
| String getDeviceName( ); | Returns the name of the device associated with the current session. |
| String getDeviceType( ); | Returns the type of device associated with the current session. |
| String[ ]getSupportedContentTypes( ); | Returns a list of supported content types of the device associated with the current session. |

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments in hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for presenting a markup language page at an information device, the markup language page having multiple portlets, the method comprising:

receiving a request from the information device;

retrieving a plurality of XSLT stylesheets for use in creating a markup language page based on the received request, wherein each XSLT stylesheet of the plurality of XSLT stylesheets includes at least one first stylesheet portion that describes data that is needed from a data model in order to use the XSLT stylesheet, and at least one second stylesheet portion that defines how a portlet of the multiple portlets is to be displayed;

combining the at least one first stylesheet portion of each XSLT stylesheet of the plurality of XSLT stylesheets without combining the at least one second stylesheet portion of each stylesheet of the plurality of XSLT stylesheets so as to generate a single combined XML description that describes the data that is needed from the data model in order to use the plurality of XSLT stylesheets;

using the single combined XML description to perform a single traversal of the data model so as to retrieve the data needed from the data model in order to use the plurality of XSLT stylesheets;

creating a markup language page by using the plurality of XSLT stylesheets with the data retrieved by using the single combined XML description to perform the single traversal of the data model; and sending the markup language page to the information device for subsequent presentation of the markup language page at the information device.

2. The method of claim 1, further comprising:

creating an XML file that includes the retrieved data, wherein creating the XML file comprises mapping data objects from the retrieved data into an XML tree of the XML file.

3. The method of claim 1, wherein the information device is a telephone, mobile phone, a personal digital assistant, a two-way pager or a computer.

4. The method of claim 1, further comprising:

presenting the markup language page at the information device.

5. The method of claim 4, wherein presenting the markup language page at the information device comprises displaying the markup language page via a browser of the information device.

6. The method of claim 1, wherein the received request is an HTTP request from the information device, and wherein the markup language page sent to the information device is formatted as an HTTP response.

7. The method of claim 6, wherein the HTTP request is a request to update an address of the information device, wherein the markup language page sent to the information device prompts a user for a new address of the information device, and wherein the markup language page provides for returning the new address to a processor that sent the markup language page to the information device.

8. The method of claim 1, wherein the markup language page includes a plurality of portlets, wherein each portlet of the plurality of portlets defines a distinct display area on the markup language page, and wherein the distinct display area defined by each portlet of the plurality of portlets is defined by an XSLT stylesheet of the plurality of XSLT stylesheets.

9. The method of claim 8, wherein a portlet of the plurality of portlets includes: (i) a set of XSLT template rules describing a presentation of the portlet, (ii) a model specification specifying data needed to support the presentation, and (iii) portlet code using a portlet API.

10. The method of claim 1, wherein the markup language page includes at least one portlet having a data entry point that allows a user to make a selection that causes the portlet to download a music file to the information device.

11. The method of claim 1, wherein creating the markup language page includes using Hand Held Device Markup Language ("HDML"), Hypertext Markup Language ("HTML"), compact HTML ("cHTML"), eXtensible HTML ("XHTML"), eXtensible Markup Language ("XML"), Wireless Markup Language ("WML"), or voice extensible Markup Language ("VoxML").

12. The method of claim 1, wherein the request from the information device comprises an HTTP request for data.

13. The method of claim 1, wherein the request from the information device comprises a request to update an address for a user of the information device.

14. The method of claim 1, further comprising:

storing within the data model the data needed from the data model in order to use the plurality of XSLT stylesheets; and storing the plurality of XSLT stylesheets in a template repository that is remote from the data model.

15. The method of claim 1, further comprising:

the mobile information device closing a portlet within the markup language page while one or more other portlets within the markup language page remain active.

16. The method of claim 1, wherein the markup language page comprises a plurality of portlets, and wherein at least one of the portlets is operable to execute a function that returns a map containing data that exists only for the life of the request from the information device.

17. The method of claim 16, wherein at least one of the portlets is operable to execute a function that returns a map containing data that exists for all sessions using the portlet.

18. The method of claim 1, wherein the first stylesheet portion that describes data that is needed from the data model for a given XSLT stylesheet describes music collection data needed from the data model, and wherein the music collection data needed from the data model comprises a private play list of music and a shared play list of music.

19. The method of claim 1, wherein the first stylesheet portion that describes data that is needed from the data model for a given XSLT stylesheet describes data needed for updating an address associated with a user of the information device, and wherein the data needed for updating the address comprises a current address of the user.

20. A computer readable medium having stored therein instructions for causing a central processing unit to execute the method of:

receiving a request from an information device;

retrieving a plurality of XSLT stylesheets for use in creating a markup language page based on the received request, wherein the markup language page includes multiple portlets, wherein each XSLT stylesheet of the plurality of XSLT stylesheets includes at least one first stylesheet portion that describes data that is needed from a data model in order to use the XSLT stylesheet, and at least one second stylesheet portion that defines how a portlet of the multiple portlets is to be displayed;

combining the at least one first stylesheet portion of each XSLT stylesheet of the plurality of XSLT stylesheets without combining the at least one second stylesheet portion of each stylesheet of the plurality of XSLT stylesheets so as to generate a single combined XML description that describes the data that is needed from the data model in order to use the plurality of XSLT stylesheets;

using the single combined XML description to perform a single traversal of the data model so as to retrieve the data needed from the data model in order to use the plurality of XSLT stylesheets;

creating a markup language page by using the plurality of XSLT stylesheets with the data retrieved by using the single combined XML description to perform the single traversal of the data model; and sending the markup language page to the information device for subsequent presentation of the markup language page at the information device.

21. A method for a database server executing a portal to create a markup language page for an information device, wherein the information device accesses the database server via an information network, the method comprising:

the database server receiving a request from the information device;

the database server retrieving a plurality of XSLT stylesheets for use in creating a markup language page based on the received request, wherein the markup language page includes multiple portlets, wherein each XSLT stylesheet of the plurality of XSLT stylesheets includes at least one first stylesheet portion that describes data that is needed from a data model in order to use the XSLT stylesheet, and at least one second stylesheet portion that defines how a portlet of the multiple portlets is to be displayed;

the database server combining the at least one first stylesheet portion of each XSLT stylesheet of the plurality of XSLT stylesheets without combining the at least one second stylesheet portion of each stylesheet of the plurality of XSLT stylesheets so as to generate a single combined XML description that describes the data that is needed from the data model in order to use the plurality of XSLT;

the database server using the single combined XML description to perform a single traversal of a data model so as to retrieve the data needed from the data model in order to use the plurality of XSLT stylesheets;

the database server creating a markup language page by using the plurality of XSLT stylesheets with the data retrieved by using the single combined XML description to perform the single traversal of the data model; and the database server sending the markup language page to the information device.

22. The method of claim 21, wherein the information device comprises a wireless mobile information device, wherein the wireless mobile information device comprises a browser application, the method further comprising:

the wireless mobile information device executing the browser application to display the markup language page.

* * * * *